United States Patent [19]

Barski

[11] Patent Number: 4,604,664

[45] Date of Patent: Aug. 5, 1986

[54] MAGNETIC DISC CARTRIDGE WITH CENTERING STRUCTURE

[75] Inventor: Guy Barski, Paris, France

[73] Assignee: CII Honeywell Bull, France

[21] Appl. No.: 462,911

[22] Filed: Feb. 1, 1983

[30] Foreign Application Priority Data

Feb. 11, 1982 [FR] France .............................. 82 02206

[51] Int. Cl.[4] .......................................... G11B 23/02
[52] U.S. Cl. ...................................... 360/97; 360/98; 360/133
[58] Field of Search .................................. 360/97–99, 360/133, 135; 206/444

[56] References Cited

U.S. PATENT DOCUMENTS

| | | | |
|---|---|---|---|
| 3,615,070 | 10/1971 | Charlton | 248/415 |
| 3,902,195 | 8/1975 | Osako et al. | 360/133 |
| 3,938,192 | 2/1976 | Caletti | 360/133 |
| 4,358,803 | 11/1982 | Van Der Giessen | 360/99 |
| 4,409,629 | 10/1983 | Puls | 360/99 |
| 4,481,552 | 11/1984 | Dona et al. | 360/97 |

*Primary Examiner*—John H. Wolff
*Attorney, Agent, or Firm*—Lowe, Price, LeBlanc, Becker & Shur

[57] ABSTRACT

A magnetic disc cartridge is adapted to be selectively inserted into a receptacle of a magnetic disc memory unit having a head for transducing magnetic data of a disc of the cartridge. The memory unit has a disc drive shaft having: (a) a rotation axis, (b) a reference plane at right angles to the rotation axis, and (c) a flange coaxial with the rotation axis. The cartridge includes a hub for coupling the drive shaft to the disc so the disc is turned by the drive shaft while the cartridge is in the receptacle. The hub and drive shaft axes are substantially coincident and invariably located at the same position when the cartridge is in the receptacle, a result achieved by a structure for precentering the cartridge with respect to the rotation axis and an elastically deformable structure mounted on the hub. The deformable structure has a first surface generally at right angles to the hub axis of rotation and a second surface extending coaxially with an axis of the hub. The elastic structure is deformed when the cartridge is in the receptacle so the first and second surfaces are respectively urged against the reference plane and coaxial flange to frictionally hold the elastic structure in situ against the reference plane and coaxial flange and repeatedly position the hub axis at the same location relative to the rotation axis.

22 Claims, 16 Drawing Figures

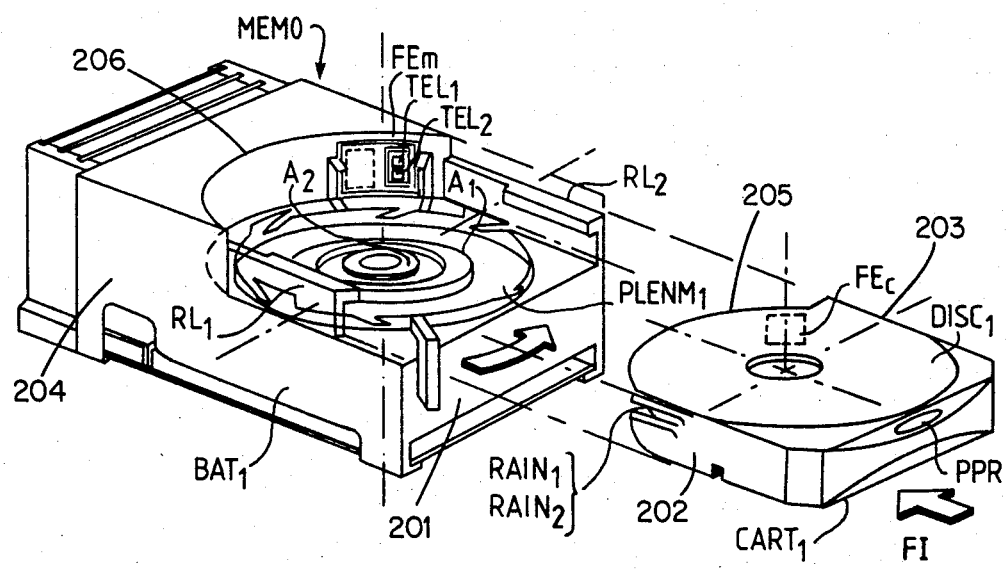
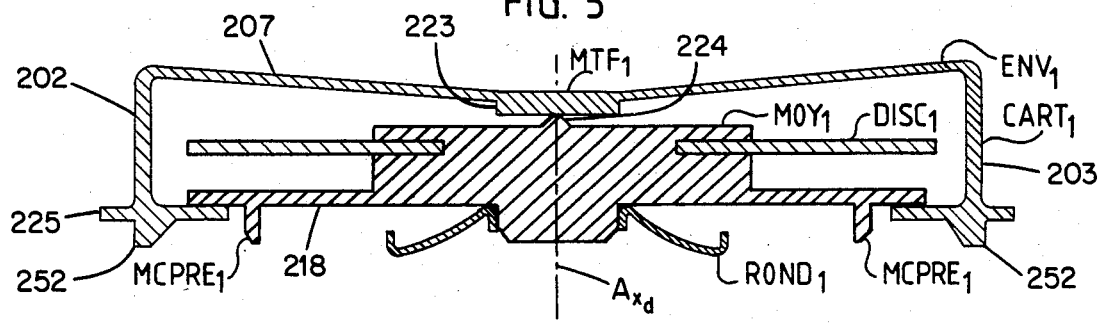
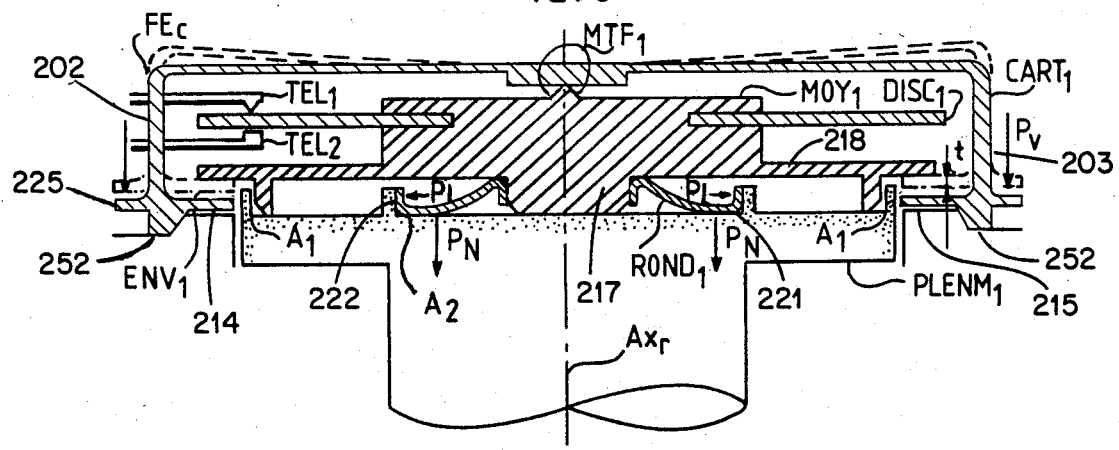

MAGNETIC DISC CARTRIDGE WITH CENTERING STRUCTURE

TECHNICAL FIELD

The present invention relates generally to magnetic disc memory cartridges and more particularly to a magnetic disc cartridge having structure for enabling the disc to be invariably located at the same position relative to a memory unit drive shaft each time the cartridge is inserted into a receptacle of the unit.

BACKGROUND ART

Magnetic disc memory units are widely used in data processing systems because such units have high storage capacity and require relatively short time for read/write heads of a disc memory to access data stored at a given point on the disc in response to a disc memory address supplied to the memory unit. Magnetic discs employed in disc memory units carry data on circular concentric tracks, typically positioned on both sides of the disc. The tracks generally have a width of no more than a few dozen microns. To transduce, i.e., read and write, data on the disc, magnetic heads of the memory units are positioned adjacent opposite faces of the disc, at a distance of a few tenths of a micron.

The magnetic discs are rotatably driven by an electric motor of the disc memory unit at a constant rotational speed. Current memory units frequently include a limited number of discs, i.e., one or two discs, and have a relatively limited storage capacity, on the order of ten to several tens of millions of bytes. Each byte typically includes eight bits, i.e., a binary digit data unit having a value equal to one or zero, as indicated by a magnetic flux transition on a track of the disc. Typically, at least one disc is enclosed in a cartridge that is selectively inserted into and removed from a receptacle of the magnetic disc memory unit. A disc memory unit receptacle normally contains only a single removable cartridge. When a cartridge is removed from the receptacle, another cartridge is immediately inserted into the receptacle as soon as read and/or write operations have been completed on the disc in the initially inserted cartridge. Thus, plural removable cartridges, each containing at least one magnetic disc, are used with a single disc memory unit.

Certain disc memory units contain two magnetic discs, one of which remains permanently inside the disc memory unit; the other disc is contained in a cartridge that is selectively inserted and removed from the disc memory unit receptacle.

Cartridges containing removable magnetic discs have standardized shapes and dimensions, enabling them to be used interchangeably with magnetic disc units of different manufacturers. Thereby, the standardized cartridges are easily inserted into and removed from the receptacles of many different magnetic disc memory units. The cartridges are constructed to protect discs located therein from contamination by dust and other particulate matter during periods while the cartridges are not in use, i.e., while a particular cartridge is not in a magnetic disc memory unit receptacle. The prior art cartridges typically include structure for ventilating the disc while the cartridge is in the disc memory unit receptacle, thereby to insure that the disc remains extremely clean, to increase reliability of data read from the disc. Exemplary of such a cartridge which is selectively inserted into and removed from a receptacle of a magnetic disc memory unit is disclosed in U.S. Pat. No. 4,078,246, commonly owned with the present invention, and entitled "Container For A Magnetic Disc".

The cartridge disclosed in the U.S. Pat. No. 4,078,246 contains a rigid disc having a relatively small diameter. The cartridge is relatively flat, having a height less than one tenth the length or width thereof. The cartridge is inserted into a suitable disc memory unit receptacle. The cartridge includes a side wall having an opening which is normally closed while the cartridge is not in use, i.e., when the cartridge is not in the disc memory unit receptacle. When the cartridge is in the disc memory unit receptacle, magnetic read/write heads of the unit extend through the opening and are moveable relative to recording tracks on the disc. The cartridge includes a mechanism for coupling a hub carrying the disc to a rotary drive mechanism, usually an electric motor, of the disc memory unit.

The cartridge includes rigid, elastically deformable, opposed, generally parallel walls having a tendency to be outwardly convex in a free state. At the center of one of the parallel walls is an internal projection, forming an annular bearing surface facing an inside face of the one wall. The other wall includes an opening coaxial with the center of the one wall. The opening in the other wall is surrounded by an annular bearing surface on the outside face of the other wall. The disc is carried by an annular hub having internal and external flanges positioned to engage the bearing surfaces of the other wall. The axial spacing between the flanges is less than the spacing between the bearing surfaces of the other wall while the other wall is in the free state, whereby when the disc is in an idle state and the parallel walls are flattened an elastic restoring force mechanically holds the disc in proper position. When the cartridge is in the receptacle of the magnetic disc memory and the disc is being driven, the disc is able to turn because the walls are urged toward each other, with a concave configuration. The bearing surfaces and flanges are constructed so that the cartridge is sealed when not in use, thereby protecting the hub carrying the disc and the disc from dust particles. By selecting suitable relative positions and diameters for the flanges, the disc is automatically ventilated during operation in response to a centrifugal effect of air on opposite faces of the disc, to provide cleaning of dust and other particular matter from the disc surface, as well as cooling.

As disclosed, for example, in commonly owned U.S. Pat. No. 4,298,898 data written onto discs enclosed in removable cartridges are separated into adjacent, circular, equal sized segments, with each side or face of the disc being normally divided into several dozen segments. Each segment is divided into two portions of different sizes, such that the larger portion contains data processed or to be processed by a data processing system including the disc memory unit containing the cartridge. The smaller portion contains track identification data used by the data processing system for positioning the read/write magnetic heads of the memory unit relative to the disc tracks. Within each segment, the smaller portion is separated into a number of reference areas. The number of reference areas is equal to the number of tracks, such that each track is associated with a single, separate area. The number of data bits per unit length along the circumference of a disc track is referred to as "longitudinal data density", while "radial density" indicates the number of tracks per unit length measured along the disc diameter.

The current trend in developing magnetic discs is focused particularly on obtaining substantial increases in radial and longitudinal densities. Typically, radial densities are on the order of 350 to 400 tracks per centimeter, i.e., 850 to 1,000 tracks per inch (TPI), while the longitudinal densities are on the order of 2,000 bits per centimer, i.e., 5,000 bits per inch (bpi).

It is difficult to obtain the same longitudinal and radial densities on removable magnetic discs enclosed in cartridges as on a disc which remains fixed permanently inside a disc memory unit. The removable feature of such cartridge enclosed magnetic discs is a limiting factor on the longitudinal and radial densities thereof. Different discs have differing mechanical dispersions, such that each disc has a different warp. In addition, different discs are located at slightly different center points within each cartridge relative to an axis of a drive motor. Thereby, variations subsist in the position of a disc track and face below magnetic heads of the disc memory unit. These variations are reflected in the amplitude of the electric signal derived by the read/write heads during a read operation, and can result in an error of a detected binary bit.

An additional limiting factor on the potential for obtaining high radial track densities, i.e., TPI, is that a coupling between a hub carrying the disc and a drive motor spindle of the disc memory unit may cause a particular track to be out of round. If a particular track is out of round, disturbances exist while track identification data are written into the reference areas and during read operations. The out of round track position results from assembly tolerances between the disc hub and the drive motor axis. The out of round position problem is further exacerbated by foreign particulate matter lodging in the various couplings between the cartridge and drive motor spindle.

To obtain the same high densities, in both the longitudinal and radial directions, for removable discs as is obtained for fixed discs, it is necessary to provide improved mechanical coupling tolerances between the disc tracks and unit heads, particularly by minimizing the out of round track positioning tolerances. It is desired to reduce the out of round track positioning tolerance to three to four microns, an improvement which is costly and difficult to obtain with the prior art cartridges, such as described in U.S. Pat. No. 4,078,246.

It is therefore an object of the present invention to provide a magnetic disc cartridge having improved mechanical coupling tolerances between the magnetic disc in the cartridge and magnetic head means of a magnetic disc memory unit.

Another object of the present invention is to provide a new and improved cartridge for at least one removable magnetic disc wherein out of round track positions caused by assembly tolerances between a hub carrying the disc and a drive motor axis for the hub are minimized.

The out of round condition has a tendency to exist in prior art cartridges containing removable magnetic discs because the disc axis of rotation is independent of the cartridge containing the disc, but is determined by the axis of the drive motor. Because the cartridge is not invariably located at the same position within the memory unit receptacle each time the cartridge is inserted in the receptacle, there is a shift in the disc position, thereby tending to increase the out of round condition between a disc track and disc memory unit head.

DISCLOSURE OF INVENTION

In accordance with the invention, a magnetic disc cartridge is precisely positioned relative to a drive shaft of a magnetic disc memory unit by a structure for precentering the cartridge with respect to the rotation axis, in combination with an elastically deformable structure mounted on a hub carrying a disc in the cartridge. The elastically deformable structure has a first surface generally at right angles to the hub axis of rotation and a second surface extending generally coaxially with the hub axis of rotation. The elastic structure is deformed so that when the cartridge is in a receptacle of the disc memory the first and second surfaces are respectively urged against a reference plane and circular flange of a memory unit drive platter for the disc. The reference plane and flange are respectively at right angles to and coaxial with the drive platter axis of rotation. The elastic structure is frictionally held in place against the reference plane and coaxial flange, thereby to repeatedly position the hub axis at the same location relative to the rotation axis. Because the hub axis, and therefore disc axis, is invariably at the same location relative to the rotation axis, read/write heads of the disc memory unit invariably write data into and read data from the same tracks on the disc, even if there is a slight misalignment between the disc and drive platter rotation axes.

The precentering structure is preferably formed as a flange on the hub and a lip on the disc drive shaft. The lip is coaxial with the drive platter rotation axis while the flange is coaxial with the hub axis. The flange has a diameter slightly less than the diameter of the lip and is positioned relative to the lip so that walls of the lip and flange contact each other in response to substantial misalignment between the drive platter and hub axes when the cartridge is in the receptacle. The flange has an edge bearing against the reference plane when the cartridge is inserted in the receptacle correctly.

In a preferred embodiment, the elastic structure is deformed by supplying a compressive force to it. The compressive force is supplied by flexible wall means of the cartridge that is deformed when the cartridge is in the receptacle.

In a preferred embodiment, the elastic structure is formed by a pad having one face abutting against the flexible cartridge wall which is generally parallel to the disc faces. A second face of the pad abuts against one portion of a sphere having a second portion bearing against the hub to urge the hub against the reference plane when the cartridge is in the receptacle.

Preferably, the flexible wall of the cartridge is the top wall that is concave when the cartridge is not in the receptacle. The flexible top wall is deformed downwardly when the cartridge is in the receptacle. The cartridge includes a bottom flange extending inwardly from a side wall thereof. The bottom flange has a top face abutting against a portion of a bottom face of the hub to form a closed, relatively dust impervious container when the cartridge is not in the receptacle. The flange is displaced downwardly when the cartridge is in the receptacle in response to the top wall being deformed so that the top face of the bottom flange is displaced from the bottom face of the hub and the only frictional contact between the walls of the cartridge and the hub is through the pad and sphere when the cartridge is in the receptacle. The cartridge is held in place in the receptacle because the cartridge includes a downwardly extending foot having a tapered face for engaging a corresponding face of the memory unit only when the top wall is deformed and the cartridge is in the receptacle.

It is, accordingly, still another object of the present invention to provide a new and improved magnetic disc cartridge having a flexible housing for exerting a compressive force on an elastic centering structure, while providing a seal for the disc within the cartridge while the cartridge is outside of disc memory units.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWINGS

FIG. 4 is a three-quarters perspective view of the overall exterior outline of a cartridge according to a preferred embodiment of the present invention, in combination with a frame of a disc memory unit with which the cartridge is associated;

FIGS. 5 and 6 are cross-sectional schematic views through the vertical plane of the cartridge to assist in describing the operating principles of the cartridge while in an idle state (i.e., when the cartridge is not in use and is outside of a disc memory unit) and in an operating postion in the disc memory unit, respectively;

DETAILED DESCRIPTION OF FIGS. 1-3

Figure 1:
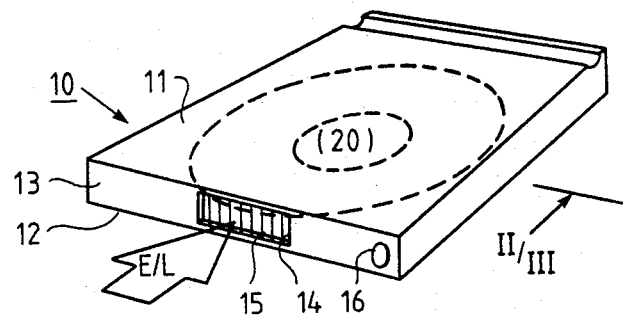
FIGS. 1, 2 and 3 are illustrations of an embodiment of a conventional, prior art cartridge containing at least one removable magnetic disc.
Figure 2:
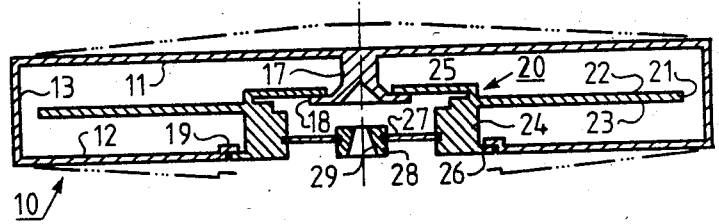
Figure 3:
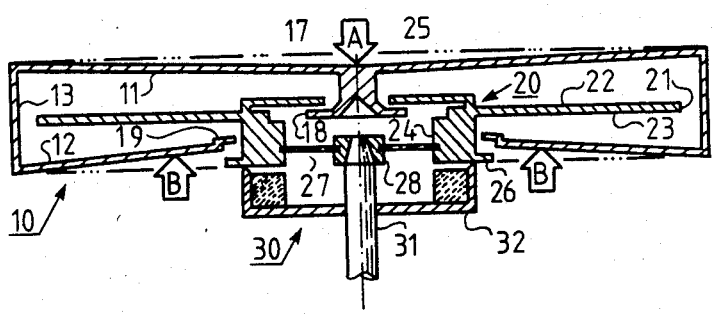

To provide a better understanding of the principles of assembly and operation of the cartridge carrying removable magnetic disc according to the present invention, the prior art configuration illustrated in FIGS. 1-3 is considered. The cartridge illustrated in FIGS. 1-3 is of the type disclosed and illustrated in U.S. Pat. No. 4,078,246.

As illustrated in FIG. 1, magnetic disc 20 is enclosed in cartridge 10, configured as a relatively flat box having square top and bottom walls 11 and 12. One side wall 13 of cartridge 10 includes aperture 14, normally closed by shutter 15 when the cartridge is not being used, i.e., when the cartridge is not in a disc memory unit receptacle. Shutter 15 is operated by a known tamper proof internal mechanism, to insure that the aperture is not obstructed while the cartridge is in the magnetic disc memory unit receptacle. Immediately after shutter 15 is opened, magnetic read/write heads E/L, represented by an arrow in FIG. 1, are introduced into cartridge 10 to read data stored on both sides of magnetic disc 20. Cartridge 10 is formed by an assembly of parts made of a rigid, but elastically deformable material.

In FIG. 2, cartridge 10 is illustrated as being in an idle or rest state, outside of a magnetic disc memory unit, between successive operating periods. In FIG. 2, upper wall 11 is illustrated as including a center, internal projection 17, terminating with an external extractor ring flange 18, forming an annular bearing surface generally parallel to walls 11 and 12 within cartridge 10. Wall 12 includes an opening coaxial with projection 17. The edge of the opening in wall 12 is defined by annular bearing surface 19.

Disc 20 is a flat annular body 21 having flat parallel faces 22 and 23, both covered with a magnetic recording coating. Disc 20 includes annular hub 24 having axially spaced and opposed extremities in the interior and exterior of the volume between walls 11–13. The extremity of hub 24 within walls 11–13 carries an inwardly extending flange 25 that engages the top face of flange 18. The external extremity of hub 24 includes outwardly extending flange 26, having a top surface which engages the bottom face of flange 19 surrounding the opening in wall 12. Hub 24 includes an internal axial passage fitted with diaphragm, 27, which is either star shaped or perforated to enable gas to pass through it. Diaphragm 27 carries centering ring 28 having a frustoconical socket or tapered hole 29.

Opposing end walls 11 and 12 of cartridge 10 are maintained substantially planar and parallel to each other, as shown by the solid lines in FIG. 2 while the cartridge is at rest, i.e., not in use. The elastic nature of walls 11 and 12, however, tends to cause the walls to be flexed outwardly, to assume a convex shape, as shown by the dotted lines in FIG. 2. There is therefore an elastic restoring force exerted on walls 11 and 12 to maintain disc 20 in place while the cartridge is in an idle or storage period. Thereby, an air tight seal is provided where flanges 25 and 26 meet bearing surfaces 18 and 19.

In FIG. 3 the position of disc 20 inside of cartridge 10 is illustrated, assuming that the cartridge is in situ within a receptacle of a magnetic disc memory unit. In response to cartridge 10 being loaded into the receptacle, walls 11 and 12 are deflected into a concave condition so that the walls move closer to each other, as indicated by the solid line positions of walls 11 and 12. The relative movement of walls 11 and 12 between the rest and service conditions is indicated in FIG. 3 by comparing the dotted line positions of the walls, as subsists when the cartridge is not in use, and the solid line positions. Because walls 11 and 12 are deflected inwardly when cartridge 10 is in the receptacle, flanges 25 and 26 of hub 20 are disengaged from bearing surfaces 18 and 19 of cartridge 10 to enable the disc to be rotated, cleaned and ventilated while it is driven by motor assembly 20 of the disc memory unit. Disc 20 and hub 24 which carries it are driven by a motor, preferably an electric motor, of the disc memory unit. The motor is coupled to spindle 31 having a tapered head which fits into tapered hole 29 of centering ring 28. Fixedly mounted on spindle 31 is platter 32, having a longitudinally extending flange with an edge for engaging the bottom face of flange 26 of hub 24. Platter 32 is perforated and magnetically coupled between hub 24 and spindle 31.

The axis of rotation of disc 20 is determined by the axis of rotation of the drive mechanism of the disc memory unit, i.e., the longitudinal axis of spindle 31. Thereby, the axis of rotation of tracks included on magnetic disc 20 while track identification data are written into reference areas of each track in the several segments of the disc by a special disc memory formatter is determined by the axis of symmetry of drive spindle 31 of the formatter. However, the axis of rotation of disc 20 during read operations is determined by the axis of symmetry of drive spindle 31 of the disc memory unit into which cartridge 10 is inserted. Because of the mechanical tolerances of drive spindle 31 of the disc memory unit performing a read operation and the disc memory formatting unit, as well as the tolerances of centering ring 28 with respect to tapered hole 29, the disc axis of rotation during the write, formatting operation has a tendency to differ from the axis of rotation of the disc during read operations. The displacement of the tracks relative to the read/write heads during the read and write operations can be as great as several microns, a distance corresponding to the tolerances of tracks on disc 20. When radial densities on the order of several hundreds of tracks per centimeter are desired, the data width is on the order of the distance between the axis of rotation of the disc during the read and write operations. Thereby, errors may occur in reading track identification data, which result in errors in the position of the magnetic heads relative to the disc track rate of position.

DETAILED DESCRIPTION OF PREFERRED EMBODIMENT

The cartridge of the present invention obviates the foregoing disadvantages in the prior art cartridge.

As illustrated in FIG. 4, cartridge $CART_1$, containing a single removable disc $DISC_1$ (FIGS. 5–7, 9 and 11), is designed to be inserted into receptacle 201 of frame $BAT_1$, a part of magnetic disc memory unit MEMO. Cartridge $CART_1$ includes grip PPR to facilitate handling by an operator who inserts the cartridge into receptacle 201. Cartridge $CART_1$ includes parallel, opposite side walls 202 and 203 in which are formed grooves $RAIN_1$ and $RAIN_2$. Grooves $RAIN_1$ and $RAIN_2$ are received in tracks $RL_1$ and $RL_2$ on opposite interior side walls of frame $BAT_1$ within receptable 201. Longitudinal tracks $RL_1$ and $RL_2$ enable cartridge $CART_1$ to be slid into receptacle 201 in the direction indicated by arrow FI.

Cartridge $CART_1$ includes an arcuate side wall 205 which generally extends between side walls 202 and 203. Side wall 205 includes aperture $FE_c$, normally covered when cartridge $CART_1$ is out of receptacle 201, by a suitable shutter. In response to cartridge $CART_1$ being inserted into receptacle 201, the shutter covering aperture $FE_c$ is opened to enable read/write heads $TEL_1$ and $TEL_2$ of memory MEMO to be inserted adjacent opposite faces of disc $DISC_1$, FIG. 6. When cartridge $CART_1$ is not in receptacle 201, heads $TEL_1$ and $TEL_2$ are positioned behind a door normally closing aperture $FE_m$ in side wall 206 in the receptacle, which side wall corresponds with side wall 205 of the cartridge.

As illustrated in FIG. 4, for example, a rotary drive mechanism for disc $DISC_1$ in cartridge $CART_1$ includes drive platter $PLENM_1$, an integral part of a spindle of an electric motor (not shown) of memory unit MEMO. Drive platter $PLENM_1$ includes a horizontal reference plane $\pi$ for receiving hub $MOY_1$ of cartridge $CART_1$ when the cartridge is inserted in receptacle 201. Extending at right angles to plane $\pi$ is the axis of rotation $Ax_r$ of drive platter $PLENM_1$. Concentric with axis $Ax_r$ and extending from plane $\pi$ are circular cylindrical flanges $A_1$ and $A_2$, having interior walls extending in a direction parallel to axis $Ax_r$. Flange $A_1$ is at the outer periphery of platter $PLENM_1$, while flange $A_2$ is at an intermediate position between axis $Ax_r$ and flange $A_1$.

Figure 11:
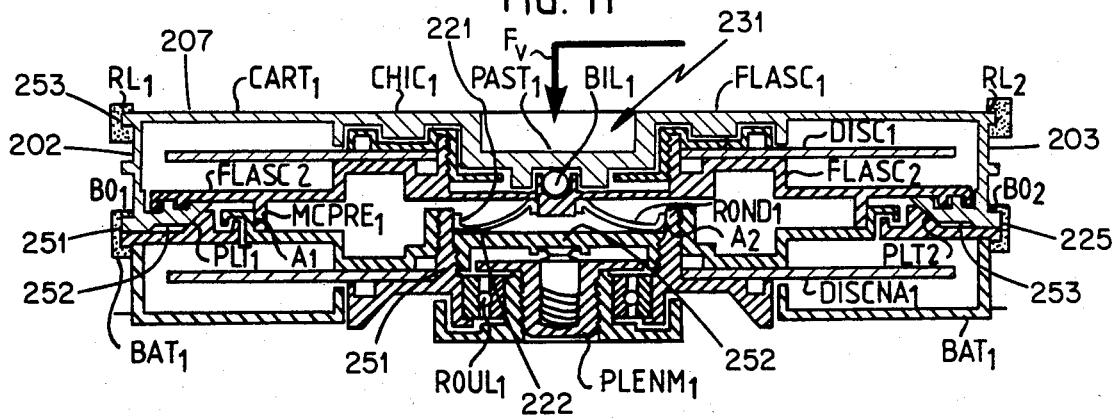
FIG. 11 is a detailed cross-sectional view through a vertical plane of a cartridge containing a single removable disc, according to the invention, in combination with structure in the memory unit with which the cartridge is associated.

As described infra in connection with FIG. 11, memory unit MEMO includes a magnetic disc which remains permanently in frame $BAT_1$; to symplify FIG. 4, the magnetic disc located permanently inside of frame $BAT_1$ is not shown. Disc $DISC_1$ and the disc permanently located in frame $BAT_1$ are driven by the same electric motor of memory MEMO.

Reference is now made more particularly to FIGS. 5 and 6, somewhat schematic drawings of the cartridge of the present invention when located outside of receptacle 201 and in place in the receptacle, respectively. Cartridge $CART_1$ includes elastically deformable plastic exterior shell $ENV_1$. Shell $ENV_1$ includes top wall 207 that extends between side walls 202 and 203. When cartridge $CART_1$ is outside receptacle 201 top wall 207 has a concave configuration, with a nadir approximately on axis $Ax_r$. When cartridge $CART_1$ is inserted into receptacle 201, the outer edges of top wall 207 are deflected downwardly so that the top face is substantially planar, as illustrated by solid lines in FIG. 6; the position of wall 207 when the cartridge is out of receptacle 21 is indicated in FIG. 6 by dotted lines. Extending inwardly from side walls 202 and 203 are flanges 214 and 215, having upper faces abutting against a lower face of hub $MOY_1$ when cartridge $CART_1$ is outside of receptacle 201. When cartridge $CART_1$ is in place in receptacle 201, side walls 202 and 203 are deflected downwardly so that the upper faces of flanges 214 and 215 are spaced from the lower face of hub $MOY_1$. When cartridge $CART_1$ is outside of receptacle 201 the spring force of top wall 207 against hub $MOY_1$ provides a relatively secure static friction fit between flanges 214 and 215 and the bottom face of hub $MOY_1$ to seal the interior of shell $ENV_1$ from the outside environment. Downward deflection of side walls 202 and 203 when cartridge $CART_1$ is in receptacle 201 removes this sealing relationship and enables hub $MOY_1$ to turn freely in response to rotation of drive platter $PLENM_1$ about axis $Ax_r$.

Downwardly depending from the bottom face of hub $MOY_1$ is circular flange $MCPRE_1$, concentric with hub axis $Ax_d$. The outer face of flange $MCPRE_1$ is removed from $Ax_d$ by a distance slightly less than the distance separating the inner wall of flange $A_1$ from axis $Ax_r$. The outer wall of flange $MCPRE_1$ and the inner wall of lip $A_1$ are thus positioned with respect to each other so that in response to substantial misalignment between axis $Ax_r$ of platter $PLENM_1$ and axis $Ax_d$ of hub $MOY_1$ when cartridge $CART_1$ is in receptacle 201 a portion of the walls of the lip and flange engage each other. When cartridge $CART_1$ is approximately correctly positioned in receptacle 201 so that there is substantial alignment between axes $Ax_r$ and $Ax_d$, there is a slight gap between the adjacent walls of lip $A_1$ and flange $MCPRE_1$ and a bottom edge of the flange engages reference plane $\pi$ of platter $PLENM_1$. Thereby, plane $\pi$ and wall $A_1$ can be considered as a "precentering means or mechanism" for cartridge $CART_1$.

As illustrated in FIGS. 5 and 6, hub $MOY_1$ includes a central, cylindrical segment 216, from which downwardly extends cylindrical gland 217, having a planar bottom face which abuts against reference plane $\pi$ of platter $PLENM_1$ when cartridge $CART_1$ is in receptacle 201. Extending radially from cylinder 216 is disc 218, from which flange $MCPRE_1$ extends downwardly. The portion of disc 218 outside of flange $MCPRE_1$ engages the top face of flange 214 when cartridge $CART_1$ is outside of receptacle 201. When cartridge $CART_1$ is inserted in 201, the bottom face of disc 218 is spaced from the top face of flange $ENV_1$. The upper part of cylinder 216 carries disc $DISC_1$ so that the disc extends at right angles to hub axis $Ax_d$. Cylinder 216, gland 217 and dish 218 are all concentric with hub axis $Ax_d$, as is flange $MCPRE_1$. Discs 218 and $DISC_1$ lie in parallel planes, which are parallel to reference plane $\pi$ when cartridge $CART_1$ is properly inserted in receptacle 201.

Fixedly secured to the side wall of gland 217 is elastically deformable ring $ROND_1$, forming an elastically deformable mechanism for precisely centering hub $MOY_1$ relative to rotation axis $Ax_r$ of platter $PLENM_1$. Ring $ROND_1$ includes a first surface 221 generally at right angles to the hub axis of rotation $Ax_d$ and a second surface 222 generally coaxial with and extending parallel to the hub axis of rotation. When cartridge $CART_1$ is inserted into receptacle 201, the elastic structure of ring $ROND_1$ is deformed so that surfaces 221 and 222 respectively bear against reference plane $\pi$ and an interior wall of circular flange $A_2$, extending at right angles from reference plane $\pi$. The contact between surface 221 and plane $\pi$ and surface 222 and the interior wall of flange $A_2$ frictionally holds ring $ROND_1$ in place against plane $\pi$ and flange $A_2$ to repeatedly position hub axis $Ax_d$ at the same location relative to rotation axis $Ax_r$.

Shell $ENV_1$ and hub $MOY_1$ include a mechanism $MTF_1$ for transmitting a compressive force $F_v$ along hub axis $Ax_d$ to hub $MOY_1$ and ring $ROND_1$ when cartridge $CART_1$ is inserted in receptacle 201; force $F_v$ is directed at right angles to the plane of disc $DISC_1$. In FIGS. 5 and 6, mechanism $MTF_1$ is schematically illustrated as plate 223 downwardly depending from the interior of wall 207, from the nadir of the wall, in combination with teat 224 that extends upwardly from the top face of cylinder 216 of hub $MOY_1$. When cartridge $CART_1$ is outside of receptacle 201, as illustrated in FIG. 5, virtually no force is exerted by plate 223 against teat 224, whereby ring $ROND_1$ remains in a relatively relaxed, undeformed state because of the undeformed, concave position of top wall 207 and the positioning of side walls 202 and 203 which causes the top face of flanges 214 and 215 to engage the bottom face of dish 218. When cartridge $CART_1$ is inserted into receptacle 201, top wall 207 is deflected downwardly whereby plate 223 pushes against teat 224, to exert force $F_v$ on hub $MOY_1$ along the hub axis $Ax_d$. The resulting compressive force along hub axis $Ax_d$ causes ring $ROND_1$ to be deformed so that surfaces 221 and 22 thereof respectively engage plane $\pi$ and the interior wall of flange $A_2$.

When cartridge $CART_1$ is inserted into receptacle 201, grooves $RAIN_1$ and $RAIN_2$ of the cartridge slide along and are guided on longitudinal tracks $RL_1$ and $RL_2$. Cartridge $CART_1$ is locked in receptacle 201 in response to a conventional lever (not shown) which is a part of memory MEMO and therefore external to the cartridge. The lever is an integral part of a threaded sleeve, a part of frame $BAT_1$ of memory MEMO. In response to the lever locking cartridge $CART_1$ in receptacle 201, top wall 207 is deflected from the concave position illustrated in FIG. 5 to the relatively flat position illustrated in FIG. 6. Simultaneously, side walls 202 and 203 descend vertically from the position illustrated in FIG. 5 to the position illustration in FIG. 6; a typical downward movement of walls 202 and 203 is on the order of four millimeters. Hub $MOY_1$ is precentered inside of lip $A_1$. Precentering hub $MOY_1$ enables cartridge $CART_1$ to attain a proper position with relative ease when the cartridge is positioned in receptacle 201. As described supra, flange $MCPRE_1$ is positioned inside of lip $A_1$, with the bottom edge of the flange engaging reference plane $\pi$.

Hub $MOY_1$ is then precisely centered using ring $ROND_1$. The precise centering occurs in response to a sleeve (not shown) inside of frame $BAT_1$ causing a uniform pressure $P_v$ to be downwardly exerted against ear 225 which extends outwardly from side walls 202 and 203 about the periphery of shell $ENV_1$. The uniform pressure $P_v$ causes deformation of elastic shell $ENV_1$ from the position illustrated in FIG. 5 to the position illustrated in FIG. 6. By deforming shell $CART_1$ to the position illustrated in FIG. 6, pressure $P_v$ transmits a compressive stress to ring $ROND_1$ via mechanism $MTF_1$ and hub $MOY_1$. In response to the compressive stress applied to ring $ROND_1$, the ring is deformed. Prior to deformation, while force $F_v$ is not applied, the diameter of ring $ROND_1$ is such that there is play of about 20 to 25 microns between surface 222 of the ring and the interior wall of flange $A_2$. In response to compressive force $F_v$, the diameter of ring $ROND_1$ expands slightly so that the periphery of the ring, i.e., surface 222, contacts the inside walls of flange $A_2$ and exerts a lateral pressure $P_1$ perpendicular to the interior wall of flange $A_2$. In addition, the compressive force $F_v$ on ring $ROND_1$ flattens the ring so that surface 221 of the ring contacts reference plane $\pi$, to exert a pressure $P_N$ normal to the reference plane.

Simultaneously with surface 221 of ring $ROND_1$ exerting a force against reference plane $\pi$, the bottom edge of flange $MCPRE_1$ exerts an additional normal pressure $P_N$ on reference plane $\pi$. Thus, the effect of compressive force $F_v$ is to insure perfect centering of axis $Ax_d$ of hub $MOY_1$, and therefore of the center of disc $DISC_1$, relative to axis $Ax_r$. In addition, compressive force $F_v$ provides an effective coupling between hub $MOY_1$ and platter $PLENM_1$. The coupling is provided by the static frictional force which effectively adheres flange $A_1$ to reference plane $\pi$ and which effectively adheres surface 222 of ring $ROND_1$ to the wall of flange $A_2$.

Simultaneously with deformation of ring $ROND_1$, flange 215 disengages from disc 218, as described supra. At this time, aperture $FE_c$ opens to allow heads $TEL_1$ and $TEL_2$ to extend through wall 206 into shell $CART_1$ in proximity to opposite faces of disc $DISC_1$. With heads $TEL_1$ and $TEL_2$ in place, disc $DISC_1$ is rotatably driven by the connection between platter $PLENM_1$ and hub $MOY_1$, on which disc $DISC_1$ is fixedly mounted.

Figure 7:
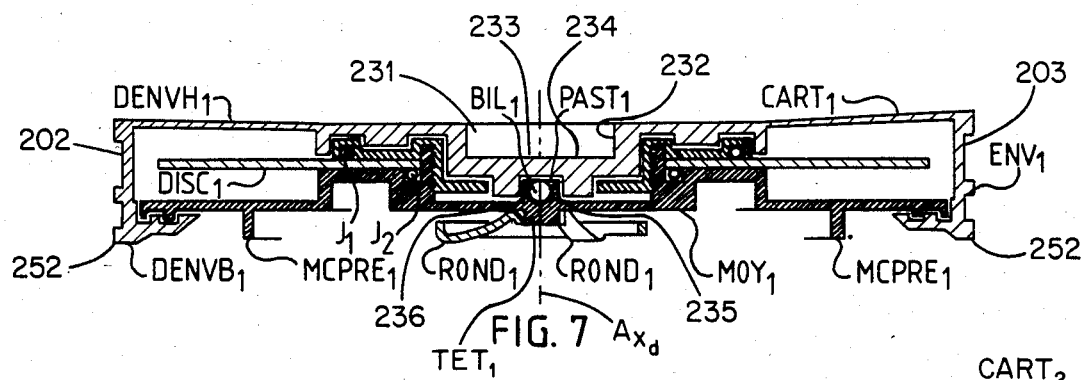
FIG. 7 is a cross-sectional view through a vertical plane of a cartridge including a single removable disc, according to a preferred embodiment of the invention.
Figure 9:
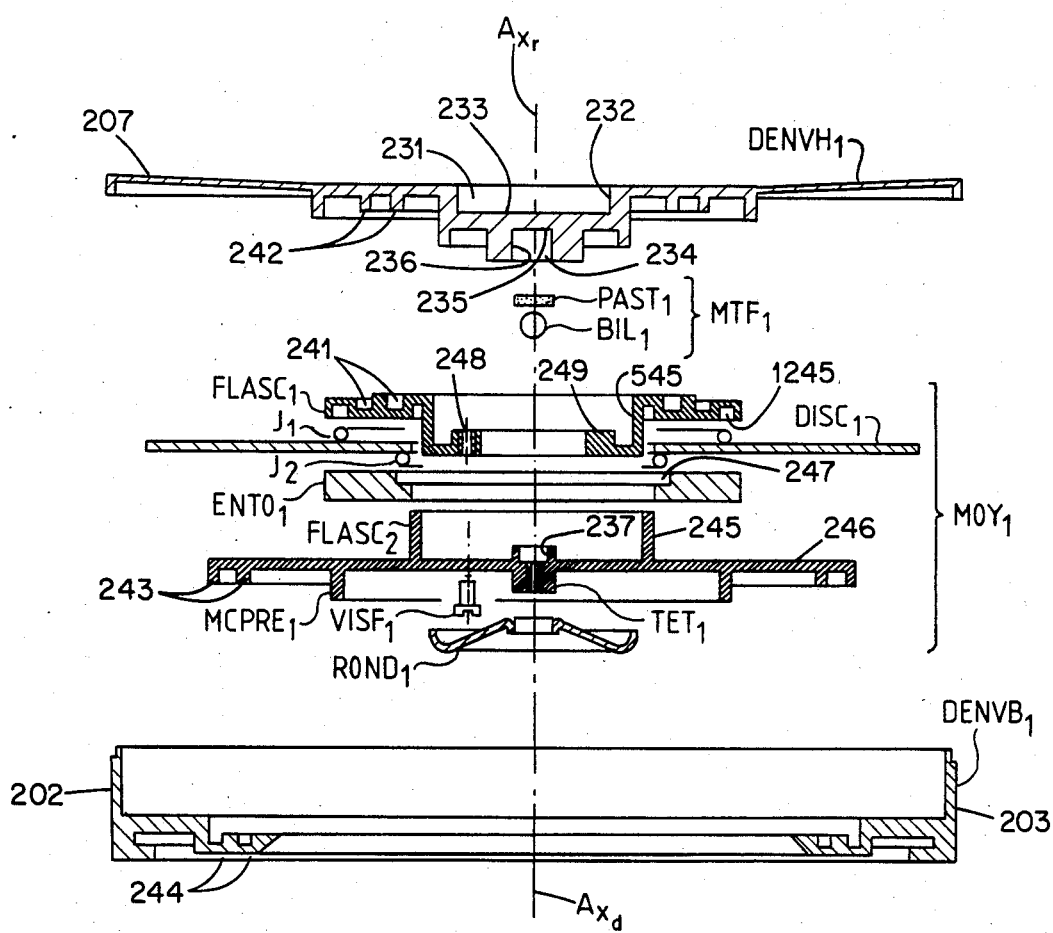
FIG. 9 is an exploded view of a cross-section through a vertical plane of the cartridge illustrated in FIG. 7.

Reference is now made to FIGS. 7, 9 and 10 of the drawing wherein cartridge $CART_1$ is illustrated in greater detail than in FIGS. 4 and 5. The operating principle of the cartridge illustrated in connection with FIGS. 7, 9 and 10 is the same as described in connection in FIGS. 5 and 6.

As illustrated in FIG. 7, cartridge $CART_1$ includes shell $ENV_1$, formed of complementary upper half shell $DENVH_1$ and lower half shell $DENVB_1$. Half shells $DENVH_1$ and $DENVB_1$ are configured approximately as indicated in FIGS. 5 and 6. However, upper half shell $DENVH_1$ includes a cylindrical center recess 231, including cylindrical wall 232 and bottom face 233. The sleeve for deforming shell $ENV_1$ fits into recess 231. Opposite from face 233 inside of shell $ENV_1$ is cylindrical cavity 234 having flat end wall 235 and cylindrical wall 236. Fixedly mounted on wall 235 is pad $PAST_1$, against which bears ball $BIL_1$. Ball $BIL_1$ is captured between hub $MOY_1$ and pad $BIL_1$, a result achieved by providing tapered cavity 237 in the top face of stud $TET_1$, centered on axis $Ax_d$ of hub $MOY_1$. Ring $ROND_1$ is secured to the lower, opposite end of stud $TET_1$, which extends into cavity 234.

Hub $MOY_1$ includes upper and lower bearing plates $FLASC_1$ and $FLASC_2$. Bearing plate $FLASC_1$ includes concentric circular grooves 241 (FIG. 9) which fit into concentric circular ridges 242 downwardly projecting from the interior of upper shell half $DENVH_1$ to hold the bearing plate in place relative to shell half $DENVH_1$. Similarly, lower bearing plate $FLASC_2$ includes downwardly extending concentric circular ridges 243 which fit into corresponding grooves 244 in lower shell half $DENVB_1$, to hold the lower bearing plate in place relative to the lower shell half.

Disc $DISC_1$ is clamped in place between bearing plates $FLASC_1$ and $FLASC_2$ and ring like cross piece $ENTO_1$, which fits snugly about the periphery of circular flange 245 that extends upwardly from disc 246 of bearing plate $FLASC_2$. Disc $DISC_1$ is held in situ by rubberized rings $J_1$ and $J_2$ which bear against the top and bottom faces of the disc. Ring $J_1$ is held by circular groove 1245 in the bottom face of bearing plate $FLASC_1$, while ring $J_2$ is held in place between the outside diameter of cylindrical wall 545 of bearing plate $FLASC_1$ and circular land 247 on the top face of cross piece $ENTO_1$. Land 247 has a diameter slightly greater than the diameter of the cylindrical portion of cross piece $ENTO_1$ which engages the outer wall of cylindrical flange 245 of bearing plate $FLASC_2$. By holding disc $DISC_1$ in place with rubberized rings $J_1$ and $J_2$ minute slipping movements between the disc due to interfering vibrations are prevented.

Extending downwardly from disc 246 of bearing plate $FLASC_2$ is circular flange $MCPRE_1$ which functions as an important part of the precentering mechanism. The unit formed by bearing plates $FLASC_1$ and $FLASC_2$ is held together by screw $VISF_1$, which extends through an aperture in disc 246 and into threaded bore 248 in ring 249 of bearing plate $FLASC_1$. The bore in disc 246 through which screw $VISF_1$ extends has a diameter less than the head of the screw. Several screws $VISF_1$ may be employed, if necessary.

Figure 10A:
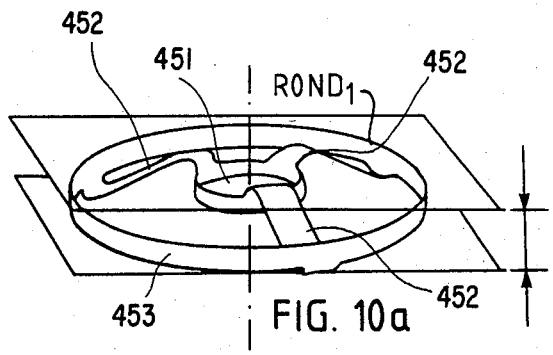
FIGS. 10a and 10b are respectively perspective and plane views of an elastically deformable ring fitted in a hub of a cartridge in accordance with the present invention.
Figure 10B:
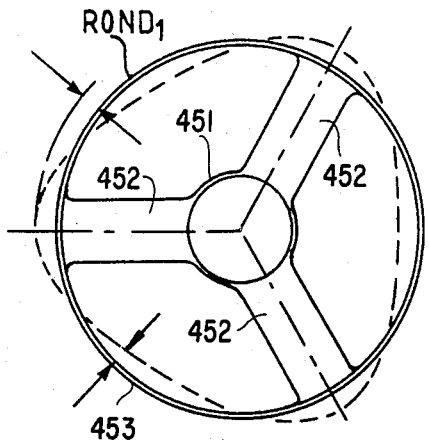

Elastic rigid ring $ROND_1$ is illustrated in detail in FIGS. 10A and 10B. As viewed in FIG. 10A, ring $ROND_1$ includes a central, cylindrical segment 451 from which extend three generally radial arms 452. The ends of radially extending arms 452 remote from cylinder 451 are connected to cylinder 453. Arms 452 are connected to opposite edges of cylinders 451 and 453, so that the inner ends of the arms are connected to the top edge of cylinder 451, while the outer ends of the arms are connected to the bottom edge of cylinder 453. In the unflexed or not deformed condition illustrated in FIG. 10A, arms 452 have a considerable upward throw and the periphery of cylinder 453 is circular, as illustrated by solid lines in FIG. 10B. In response to ring $ROND_1$ being deformed by force $F_v$, arms 452 are pushed downwardly to a flexed condition, causing cylinder 453 to be deformed into a generally triangular shape, having rounded edges, as illustrated by dotted lines in FIG. 10B. Deformation of ring $ROND_1$ causes the circular end segments of cylinder 453 attached to arms 452 to be pushed outwardly from the center of the ring, and therefore from axis $Ax_d$, by a greater distance than any portion of the periphery of cylinder 453 when the ring is in an undeformed state. Thereby, lateral pressure $P_L$ is exerted by cylinder 453 on the inner wall of flange 222. Simultaneously, the portions of segments 452 closest to cylinder 453 are urged downwardly, to provide normal pressure $P_n$.

The physical deformation properties of ring $ROND_1$ are such that the ring returns to its initial shape following each deformation and is deformed to the same extent each time it is inserted into a memory disc unit receptacle. Thereby, cartridge $CART_1$ can be inserted many times into receptacle 201 of the same disc memory MEMO, or into the receptacle of different disc memories. Each time cartridge $CART_1$ is inserted into receptacle 201, ring $ROND_1$ undergoes the same degree of deformation within a ten micron range. The thickness of ring $ROND_1$ is such that there is an equivalence between the contact of ring surface 221 with reference plane and the compensation of the play between surface 221 and the interior wall of circular flange $A_2$; this compensation, as described supra, is on the order of 20 microns.

Figure 8:
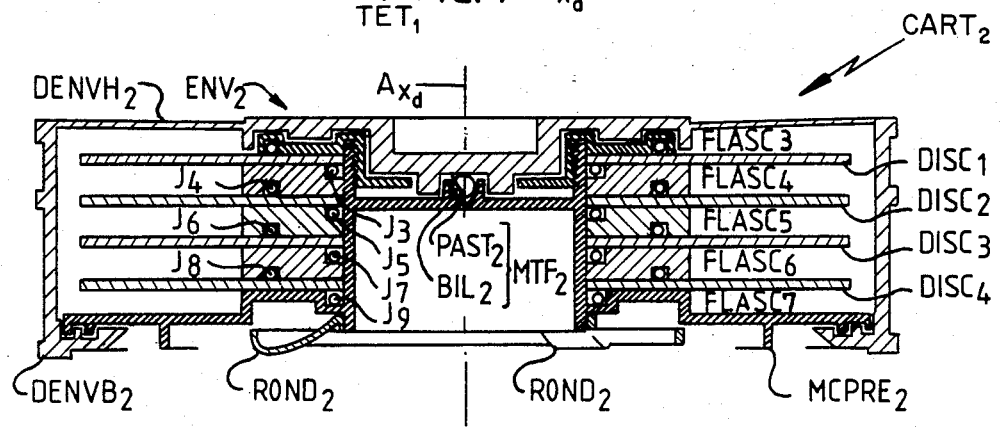
FIG. 8 is a cross-sectional view through a vertical plane of a cartridge including four removable discs, in accordance with a further preferred embodiment of the invention.

Reference is now made to FIG. 8 of the drawing wherein a second embodiment of the invention is illustrated as including cartridge $CART_2$ in which are located four discs $DISC_2$, $DISC_3$, $DISC_4$, and $DISC_5$, lying in mutually parallel planes, and concentric with axis $Ax_d$. Discs $DISC_2$–$DISC_5$ are mounted on hub $MOY_2$ which is constructed similarly to hub $MOY_1$, but has a longer length, to accommodate bearing plates $FLASC_3$, $FLASC_4$, $FLASC_5$, $FLASC_6$ and $FLASC_7$ which are positioned in stacked relationship to each other. Discs $DISC_2$–$DISC_5$ are held in situ between bearing plates $FLASC_3$–$FLASC_7$ by rubberized rings $J_3$–$J_9$, in a manner similar to how disc $DISC_1$ is held in place between rings $J_1$ and $J_2$ by bearing plates $FLASC_1$ and $FLASC_2$, in combination with cross piece $ENTO_1$.

Cartridge $CART_2$ includes shell $ENV_2$ including complementary top and bottom half halves $DENVH_2$ and $DENVB_2$. Elastically deformable percision centering ring $ROND_2$ extends from hub $MOY_2$ in the same manner that ring $ROND_1$ extends from hub $MOY_1$. A compressive force is transmitted to ring $ROND_2$ by mechanism $MTF_2$ that includes pad $PAST_2$ and ball $BIL_2$. It is apparent that the principles of assembly and operation of cartridge $CART_2$ are identical to those of cartridge $CART_1$.

Reference is now made to FIG. 11 of the drawing, a detailed drawing of cartridge $CART_1$ in the position it occupies inside of receptacle 201 of disc memory unit MEMO. In FIG. 11 is illustrated a portion of the drive mechanism of disc memory unit MEMO. In particular, drive platter $PLENM_1$ includes ball bearings $ROUL_1$, connected between drive platter $PLENM_1$ and collar 251 of which flange $A_2$ is an integral part. Collar 251 carries disc $DISCNA_1$ which is permanently located in disc memory unit MEMO. Collar 251 includes a planar, horizontally extending segment 252, the top face of which defines reference plane $\pi$. Ring $ROND_1$ is illustrated in FIG. 11 as including surfaces 221 and 222 which respectively contact reference plane $\pi$ and the interior wall of flange $A_2$. The precentering mechanism comprising flange $MCPRE_1$ on hub $MOY_1$ and lip $A_1$ on drive platter $PLENM_1$ is also illustrated in FIG. 11.

In the embodiment illustrated in FIG. 11, cartridge $CART_1$ is held in place while it is deformed from the position illustrated in FIG. 5 to the position illustrated in FIG. 6 by ears on the side walls of the cartridge and grooves in receptacle 201. In particular, ears 253 and 254 project outwardly from top wall 207, past side walls 202 and 203 and are received by tracks $RL_1$ and $RL_2$ extending longitudinally within receptacle 201. Receptacle 201 also includes longitudinally extending tracks $BAT_1$ and BO for receiving ears 225 which project outwardly from side walls 202 and 203, at the bottom of cartridge $CART_1$. Guides $RL_1$, $RL_2$, $BAT_1$ and BO exert a pressure along the entire periphery of cartridge $CART_1$, to hold shell $ENV_1$ in a deformed state when compressive force $F_v$ is exerted on the shell by the sleeve that engages recess 231.

To assist in holding cartridge $CART_1$ in place in receptacle 201, feet 252 and 253 extend inwardly from the bottoms of side walls 202 and 203. Feet 252 include inclined edges which abut against complementary inclined edges $PLT_1$ and $PLT_2$ of frame $BAT_1$, within receptacle 201.

Figure 12:
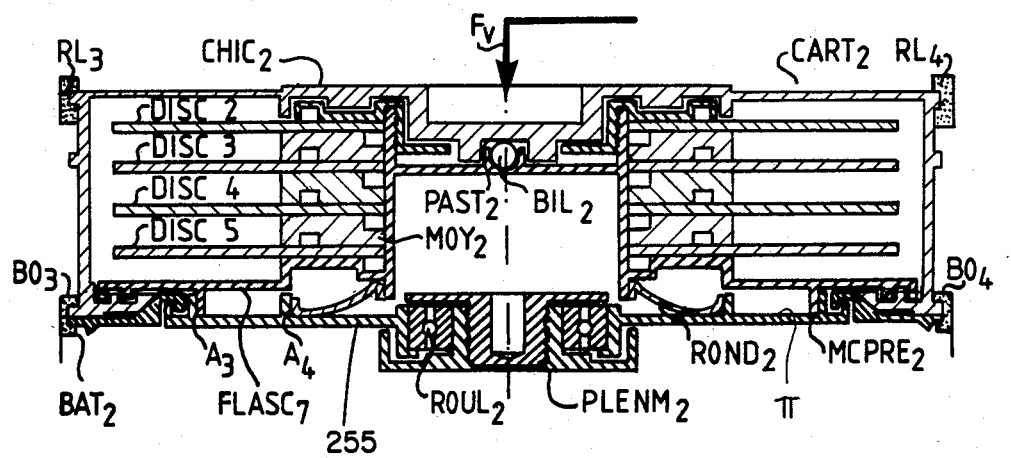
FIG. 12 is a detailed cross-sectional view through a vertical plane of a cartridge containing four removable discs, according to the invention, in combination with structure in the memory unit with which the cartridge is associated.

Reference is now made to FIG. 12 of the drawing, wherein cartridge $CART_2$ is illustrated as being positioned inside of a disc memory unit having four sets of read/write heads, similar to the single set of read/write heads illustrated in FIGS. 4 and 6. The memory illustrated in FIG. 12 does not include a permanently mounted disc, similar to disc $DISCNA_1$, FIG. 11.

In FIG. 12, cartridge $CART_2$ is illustrated in position in tracks $RL_3$ and $RL_4$, similarly to the manner in which cartridge $CART_1$ is positioned in tracks $RL_1$ and $RL_2$. Cartridge $CART_2$ includes ring $ROND_2$ having first and second surfaces which respectively engage the wall of flange $A_4$ and plate 255 of disc platter $PLENM_2$. Platter $PLENM_2$ is coupled to plate 255 by way of ball bearings $ROUL_2$. Ring $ROND_2$ has greater inner and outer diameters than corresponding ring $ROND_1$ in the embodiment of FIG. 11 because ring $ROND_2$ is connected to cylinder 256 on which are mounted discs $DISC_2$–$DISC_5$ and bearing plates $FLASC_3$–$FLASC_7$. Pressure is exerted on the bottom of cartridge $CART_2$, along the periphery of the cartridge by tracks $BO_3$ and $BO_4$ in receptacle 201, similarly to the manner in which tracks $BAT_1$ and BO exert pressure on the bottom of cartridge $CART_1$. The pressure exerted by tracks $RL_3$, $RL_4$, $BO_3$ and $BO_4$ on cartridge $CART_2$ deforms the cartridge in a manner similar to deformation of the cartridge of FIG. 11. In response to cartridge $CART_2$ being deformed, compressive force $F_v$ is applied through transmission mechanism $MTF_2$, formed of ball $BIL_2$ and pad $PAST_2$, to hub $MOY_2$. The pressure exerted on hub $MOY_2$ by compressive force $F_v$ causes ring $ROND_2$ to be deformed in the same manner described supra for ring $ROND_1$.

Reference is now made to FIG. 13 of the drawing, wherein it is schematically indicated how the rotation axis $Ax_d$ of hub $MOY_1$, and therefore the rotation axis of disc $DISC_1$, is controlled through the use of deformable ring $ROND_1$ of cartridge $CART_1$. It is to be understood that the description given in connection with FIG. 13 is applicable to centering the axis of rotation of hub $MOY_2$ and therefore the axes of rotation of discs $DISC_2$–$DISC_5$. In FIG. 13, the outer periphery of cylinder 253 of ring $ROND_1$ is indicated by reference character $ROND_1$.

Figure 13A:
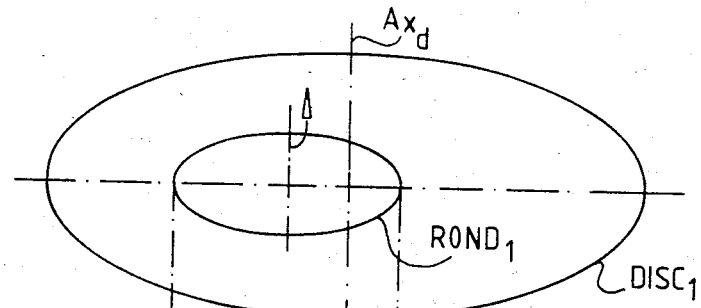
FIGS. 13a, 13b and 13c includes illustrations of operating principles of the cartridge according to the invention, to show how precisely the disc is centered on axis of rotation of a hub carrying the disc.

In FIG. 13A, disc $DISC_1$ and ring $ROND_1$ are assumed to be in the position they occupy when cartridge $CART_1$ is outside of disc memory unit MEMO. Axis $\Delta$ of ring $ROND_1$ does not normally coincide with axis $Ax_d$ of disc $DISC_1$. Typically, the distance between axes $\Delta$ and $Ax_d$ is on the order of a few microns, whereby ring $ROND_1$ is normally slightly off-center relative to disc $DISC_1$.

Figure 13B:
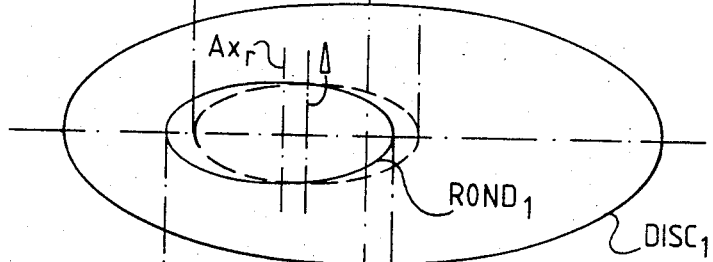
Figure 13C:
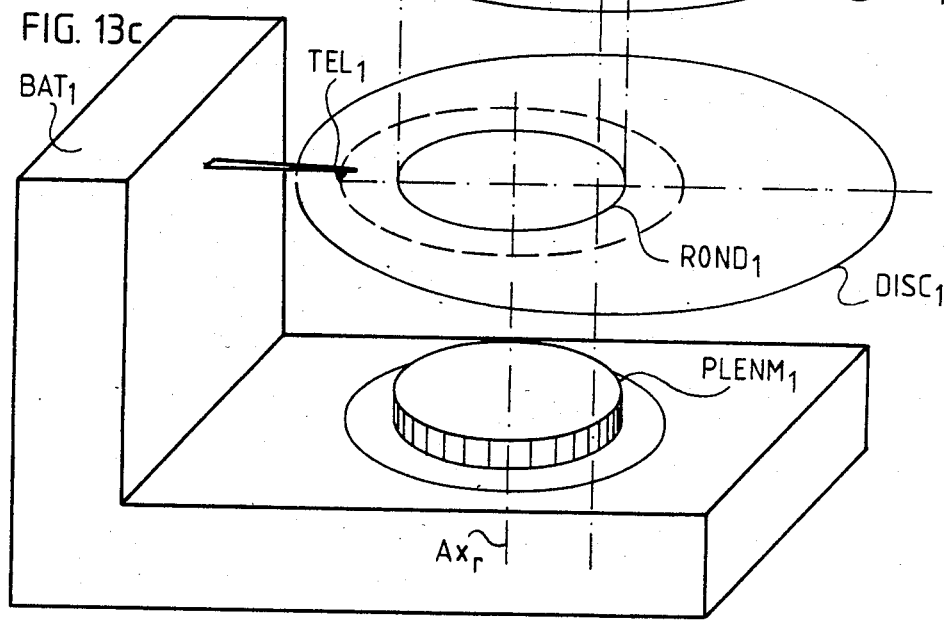

In FIG. 13B, it is assumed that cartridge $CART_1$ has been inserted into receptacle 201 of disc memory unit MEMO and that the coupling between hub $MOY_1$ and drive platter $PLENM_1$ has been completed. Thereby, ring $ROND_1$ is deformed, to occupy the position illustrated by solid lines in FIG. 13B; the position occupied by ring $ROND_1$ prior to insertion is indicated by dotted lines in FIG. 13B. When cartridge $CART_1$ is in place in receptacle 201, axis $\Delta$ of ring $ROND_1$ coincides with axis $Ax_r$ of drive platter $PLENM_1$. However, axes $Ax_r$ and $\Delta$ are displaced by a slight amount from axis $Ax_d$ of hub $MOY_1$, by virtue of the elastic nature of ring $ROND_1$. Typically, the distance between a coincident line for axes $Ax_r$ and $\Delta$ and axis $Ax_d$ is on the order of 3 to 4 microns. Because of the displacement of axes $Ax_r$ and $ROND_1$, turning of drive platter $PLENM_1$ results in offcenter turning of disc $DISC_1$ and tracks on the disc. However, since ring $ROND_1$ is always deformed by the same amount each time cartridge $CART_1$ is inserted into receptacle 201, there are identical displacements between axes $Ax_r$ and $Ax_d$ each time the cartridge is inserted into the receptacle. Therefore, each track on disc $DISC_1$ is symmetrical with axis $Ax_r$, rather than with axis $Ax_d$. In consequence, data are precisely written and read from the tracks on disc $DISC_1$ because the tracks are symmetrical with respect to the same axis, even though the axis of symmetry is not the axis of disc $DISC_1$ and hub $MOY_1$. Because ring $ROND_1$ is identically deformed each time cartridge $CART_1$ is inserted into a receptacle of any magnetic disc memory, different tracks on disc $DISC_1$ are always identically positioned relative to drive platter axis $Ax_r$. Thereby, head $TEL_1$, FIG. 13C, is capable of writing data into and reading data from identical tracks on disc $DISC_1$.

Drive platters $PLENM_1$ and $PLENM_2$ in the embodiments of FIGS. 11 and 12 respectively include ball bearings $ROUL_2$ and $ROUL_2$. The ball bearings have a tendency to cause discs $DISC_1$, $DISCNA_1$ and $DISC_2$–$DISC_5$ to become contaminated with particles of ball bearing lubricant. To prevent such contamination, cartridges $CART_1$ and $CART_2$ include tortuous paths between the ball bearings and the disc portions containing data. The tortuous path in cartridge $CART_1$ includes baffle $CHIC_1$, formed between top wall 207 and bearing plate $FLASC_1$ between the center of cartridge $CART_1$ and the data carrying portion of disc DISC$_1$. In cartridge CART$_2$, a similar baffle CHICH$_2$ is provided between the top wall of the cartridge and bearing plate FLASC$_3$. Baffles CHIC$_1$ and CHIC$_2$ may, to advantage, be replaced by ferro-fluidic joints, such as manufactured by the U.S. Company, Ferro-fluidic Incorporated. The ferro-fluidic joints and baffles can also be used to prevent contamination by lubricants of ball bearings that may be included at opposite ends of hubs MOY$_1$ and MOY$_2$, as disclosed in co-pending commonly assigned application of Droux et al, Ser. No. 451,596, filed Dec. 20, 1982, entitled Cartridge For Removable Magnetic Disc(s).

While there have been described and illustrated several specific embodiments of the invention, it will be clear that variations in the details of the embodiments specifically illustrated and described may be made without departing from the true spirit and scope of the invention as defined in the appended claims.

I claim:

1. A cartridge for a removable magnetic disc designed to be inserted into a suitable receptacle of a magnetic disc memory unit, the cartridge comprising a shell inside which the disc is positioned, the shell having an aperture through which a transducing head for accessing data contained on the disc is introduced, the head being a part of the memory unit, a hub for carrying the disc, means for coupling the hub to a rotary drive mechanism of the memory unit, the rotary drive mechanism including a reference planar surface and reference cylinder concentric with a rotation axis of the rotary drive mechanism, the hub including:
   a cylindrical mechanism contacting the reference planar surface for precentering the hub on the axis of rotation of the drive mechanism when the cartridge is in the receptacle, and
   an elastically deformable mechanism contacting the reference planar surface and an internal wall of the reference cylinder for precisely centering the hub relative to the axis of rotation when the cartridge is in the receptacle;
   the shell including means for applying a compressive force to the hub and to the elastic mechanism, the compressive force being applied perpendicular to the plane of the disc to deform the elastic mechanism in such a way that the elastic mechanism simultaneously exerts pressures perpendicular to and against the reference planar surface and perpendicular to and against the wall of the reference cylinder.

2. The cartridge of claim 1 wherein the elastically deformable mechanism is formed as a ring installed on the hub, the ring being positioned inside of the reference cylinder.

3. The cartridge of claim 2 wherein the means for applying the compressive force includes a pad, a ball contacting the pad and the hub for transmitting the compressive force from the pad to the hub.

4. The cartridge of claim 1 wherein the means for applying the compressive force includes a pad, a ball contacting the pad and the hub for transmitting the compressive force from the pad to the hub.

5. The magnetic disc cartridge of claim 1 wherein the cartridge includes a flexible top wall that is concave when the cartridge is not in the receptacle, and is deformed downwardly when the cartridge is in the receptacle, a bottom flange extending inwardly from a side wall of the cartridge, the bottom flange having a top face abutting against a portion of a bottom face of the hub when the cartridge is not in the receptacle, the bottom flange being deformed so that the top face of the bottom flange is displaced from the bottom face of the hub and the only frictional contact between walls of the cartridge and the hub is through the compressive force applying means when the cartridge is in the receptacle.

6. The cartridge of claim 1 wherein the elastically deformable mechanism is formed as a ring having a central portion fixed to the hub and plural radially extending arms and an outer cylindrical portion for contacting the wall of the reference cylinder, the arms and outer portion respectively being in an unflexed condition and having a generally circular configuration coaxial with the hub when the compressive force is not applied to the hub, the arms being in a flexed condition to push segments of the outer portion attached thereto outwardly and distort the outer portion from the generally circular configuration while the compressive force is applied to the hub, the flexed arms bearing against the reference planar surface to exert the pressure perpendicular to and against the reference planar surface, the outwardly pushed segments bearing against the wall of the reference cylinder to exert the pressure perpendicular to and against the wall of the reference cylinder.

7. A magnetic disc cartridge adapted to be selectively inserted into a receptacle of a magnetic disk memory unit having head means for transducing magnetic data of a disc of the cartridge, the memory unit having a disc drive shaft having: (a) a rotation axis, (b) a reference planar surface at right angles to the rotation axis, and (c) a flange coaxial with the rotation axis, the cartridge comprising means for coupling the drive shaft to the disc so the disc is turned by the drive shaft while the cartridge is in the receptacle, the coupling means including a hub having an axis of rotation at right angles to faces of the disc, a drive connection for the hub extending to the drive shaft, and means for enabling the hub and drive shaft axes to be substantially coincident and invariably located at the same position when the cartridge is inserted into the receptacle so the hub and disc are positioned to be driven by the drive shaft, and said last named means including: an elastically deformable structure mounted on the hub, the deformable structure having a first surface and a second surface extending coaxially with the hub axis, and means for deforming the elastic structure so that when the cartridge is in the receptacle the first and second surfaces are respectively simultaneously urged against the reference planar surface and coaxial flange to frictionally hold the elastic structure in situ against the reference planar surface and coaxial flange and thereby repeatedly position the hub axis at the same location relative to the rotation axis.

8. The magnetic disc cartridge of claim 7 wherein the disc drive shaft includes a lip coaxial with the shaft rotation axis, the cartridge including means for precentering the cartridge with respect to the shaft rotation axis prior to the deformable structure being deformed, the precentering means including: a flange on the hub, the flange having a diameter slightly less than the diameter of the lip, the flange being positioned relative to the lip so that walls of the lip and flange contact each other in response to substantial misalignment between the rotation axis and hub axis when the cartridge is in the receptacle, the flange having an edge bearing against the reference planar surface when the cartridge is inserted in the receptacle.

9. The magnetic disc cartridge of claim 8 wherein the cartridge includes flexible wall means that is deformed when the cartridge is in the receptacle, the wall means when deformed supplying a compressive force to the means for deforming to cause the means for deforming to urge the first and second surfaces of the deformable structure against the reference plane and the coaxial flange, the flange edge bearing against the reference planar surface regardless of whether the wall means is or is not deformed when the cartridge is in the receptacle.

10. The magnetic disc cartridge of claim 9 wherein the means for deforming includes a pad having one face abutting against a deformable top wall or the cartridge generally parallel to the disc and a second face abutting against the portion of a sphere having a second portion bearing against the hub to urge the hub against the reference planar surface.

11. The magnetic disc cartridge of claim 7 wherein the elastically deformable structure is formed as a ring having a central portion fixed to the hub and plural radially extending arms including the first surface and an outer cylindrical portion contacting the second surface, the arms and outer portion respectively being in an unflexed condition and having a generally circular configuration coaxial with the hub when the compressive force is not applied to the hub, the arms being in a flexed condition to push segments of the outer portion attached thereto outwardly and distort the outer portion from the generally circular configuration while the compressive force is applied to the hub, the flexed arms bearing against the reference planar surface to exert a pressure perpendicular to and against the reference planar surface, the outwardly pushed segments bearing agains the flange to exert a pressure perpendicular to and against the flange.

12. A magnetic disc cartridge adapted to be selectively inserted into a receptacle of a magnetic disk memory unit having head means for transducing magnetic data of a disc of the cartridge, the memory unit having a disc drive shaft having: (a) a rotation axis, (b) a reference planar surface at right angles to the rotation axis, and (c) a flange coaxial with the rotation axis, the cartridge comprising a shell within which the disc is mounted, the shell having first and second end walls generally parallel to each other and faces of the disc, is well as a side wall including a normally closed opening through which the head means is inserted while the cartridge is in the receptacle, means for coupling the drive shaft to the disc so the disc is turned by the drive shaft while the cartridge is in the receptacle, the coupling means including a hub having an axis of rotation at right angles to the parallel walls, a drive connection for the hub extending through the first wall to the drive shaft, and means for enabling the hub and drive shaft axes to be substantially coincident and invariably located at the same position when the cartridge is inserted into the receptacle so the hub and disc are positioned to be driven by the drive shaft, said last named means including: a structure for precentering the cartridge with respect to the rotation axis, an elastically deformable structure mounted on the hub, the deformable structure having a first surface generally at right angles to the hub axis of rotation and a second surface extending coaxially with the hub axis, and means for deforming the elastic structure so that when the cartridge is in the receptacle the first and second surfaces are respectively simultaneously urged against the reference planar surface and coaxial flange to frictionally hold the elastic structure in situ against the reference planar surface and coaxial flange and thereby repeatedly position the hub axis at the same location relative to the rotation axis.

13. The magnetic disc cartridge of claim 12 wherein the disc drive shaft includes a lip coaxial with the rotation axis, the hub including a flange having a diameter slightly less than the diameter of the lip, the flange being positioned relative to the lip so that walls of the lip and flange contact each other in response to substantial misalignment between the rotation axis and hub axis when the cartridge is in the receptacle, the flange having an edge bearing against the reference planar surface when the cartridge is inserted in the receptacle.

14. The magnetic disc cartridge of claim 13 wherein the cartridge includes flexible wall means that is deformed when the cartridge is in the receptacle, the wall means when deformed supplying a compressive force to the means for deforming to cause the means for deforming to urge the first and second surfaces against the reference plane and the coaxial flange, the flange edge bearing against the reference planar surface regardless of whether the wall means is or is not deformed when the cartridge is in the receptacle.

15. The magnetic disc cartridge of claim 14 wherein the means for deforming includes a pad having one face abutting against a deformable top wall of the cartridge generally parallel to the disc and a second face abutting against one portion of a sphere having a second portion bearing against the hub to urge the hub against the reference plane.

16. The magnetic disc cartridge of claim 15 wherein the flexible wall means includes a flexible top wall that is concave when the cartridge is not in the receptacle and is deformed downwardly when the cartridge is in the receptacle, a bottom flange extending inwardly from a side wall of the cartridge, the bottom flange having a top face abutting against a portion of a bottom face of the hub when the cartridge is not in the receptacle, the bottom flange being displaced downwardly when the cartridge is in the receptacle in response to the top wall being deformed so that the top face of the bottom flange is displaced from the bottom face of the hub and the only frictional contact between walls of the cartridge and the hub is through the pad and sphere when the cartridge is in the receptacle.

17. The magnetic disc cartridge of claim 16 wherein the cartridge includes downwardly extending foot means having a tapered face for engaging a corresponding face of the memory unit only when the top wall is deformed and the cartridge is in the receptacle.

18. The magnetic disc cartridge of claim 12 wherein the cartridge includes flexible wall means that is deformed when the cartridge is in the receptacle, the wall means when deformed supplying a compressive force to the means for deforming to cause the means for deforming to urge the first and second surfaces against the reference planar surface and the coaxial flange, the flange edge bearing against the reference planar surface regardless of whether the wall means is or is not deformed when the cartridge is in the receptacle.

19. The magnetic disc cartridge of claim 18 wherein the means for deforming includes a pad having one face abutting against a deformable top wall of the cartridge generally parallel to the disc and a second face abutting against one portion of a sphere having a second portion bearing against the hub to urge the hub against the reference planar surface.

20. The magnetic disc cartridge of claim 12 wherein the cartridge includes: a flexible top wall that is concave when the cartridge is not in the receptacle, and is deformed downwardly when the cartridge is in the receptacle, a bottom flange extending inwardly from a side wall of the cartridge, the bottom flange having a top face abutting against a portion of a bottom face of the hub when the cartridge is not in the receptacle, the bottom flange being displaced downwardly when the cartridge is in the receptacle in response to the top wall being deformed so that the top face of the bottom flange is displaced from the bottom face of the hub and the only frictional contact between walls of the cartridge and the hub is through the means for deforming when the cartridge is in the receptacle.

21. The magnetic disc cartridge of claim 20 wherein the cartridge includes downwardly extending foot means having a tapered face for engaging a corresponding face of the memory unit only when the top wall is deformed and the cartridge is in the receptacle.

22. The magnetic disc cartridge of claim 12 wherein the elastically deformable structure is formed as a ring having a central portion fixed to the hub and plural radially extending arms including the first surface and an outer cylindrical portion contacting the second surface, the arms and outer portion respectively being in an unflexed condition and having a generally circular configuration coaxial with the hub when the compressive force is not applied to the hub, the arms being in a flexed condition to push segments of the outer portion attached thereto outwardly and distort the outer portion from the generally circular configuration while the compressive force is applied to the hub, the flexed arms bearing against the reference planar surface to exert a pressure perpendicular to and against the reference planar surface, the outwardly pushed segments bearing agains the flange to exert a pressure perpendicular to and against the flange.

* * * * *